July 2, 1935.  R. C. ANGELL ET AL  2,006,333
FABRICATION OF FLEXIBLE SHAFTING
Filed March 24, 1931   7 Sheets-Sheet 4
FIG. VI.
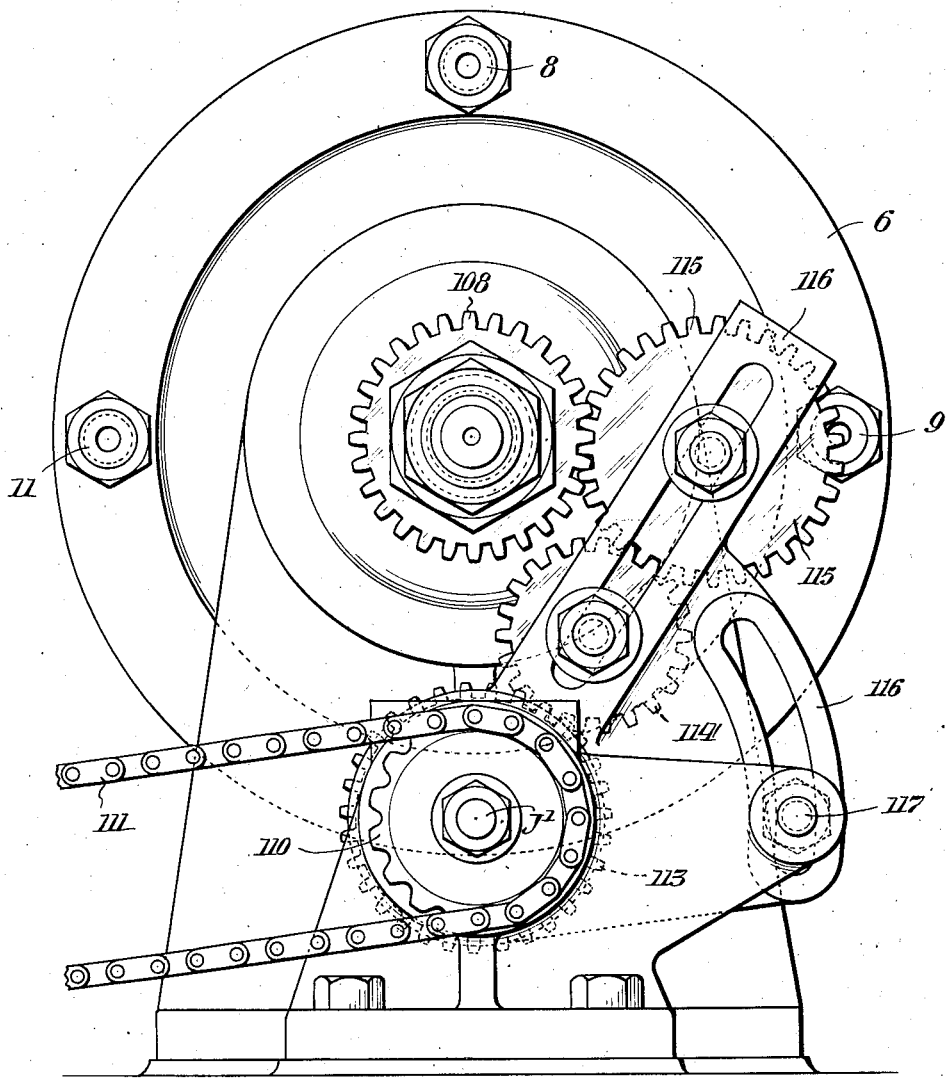

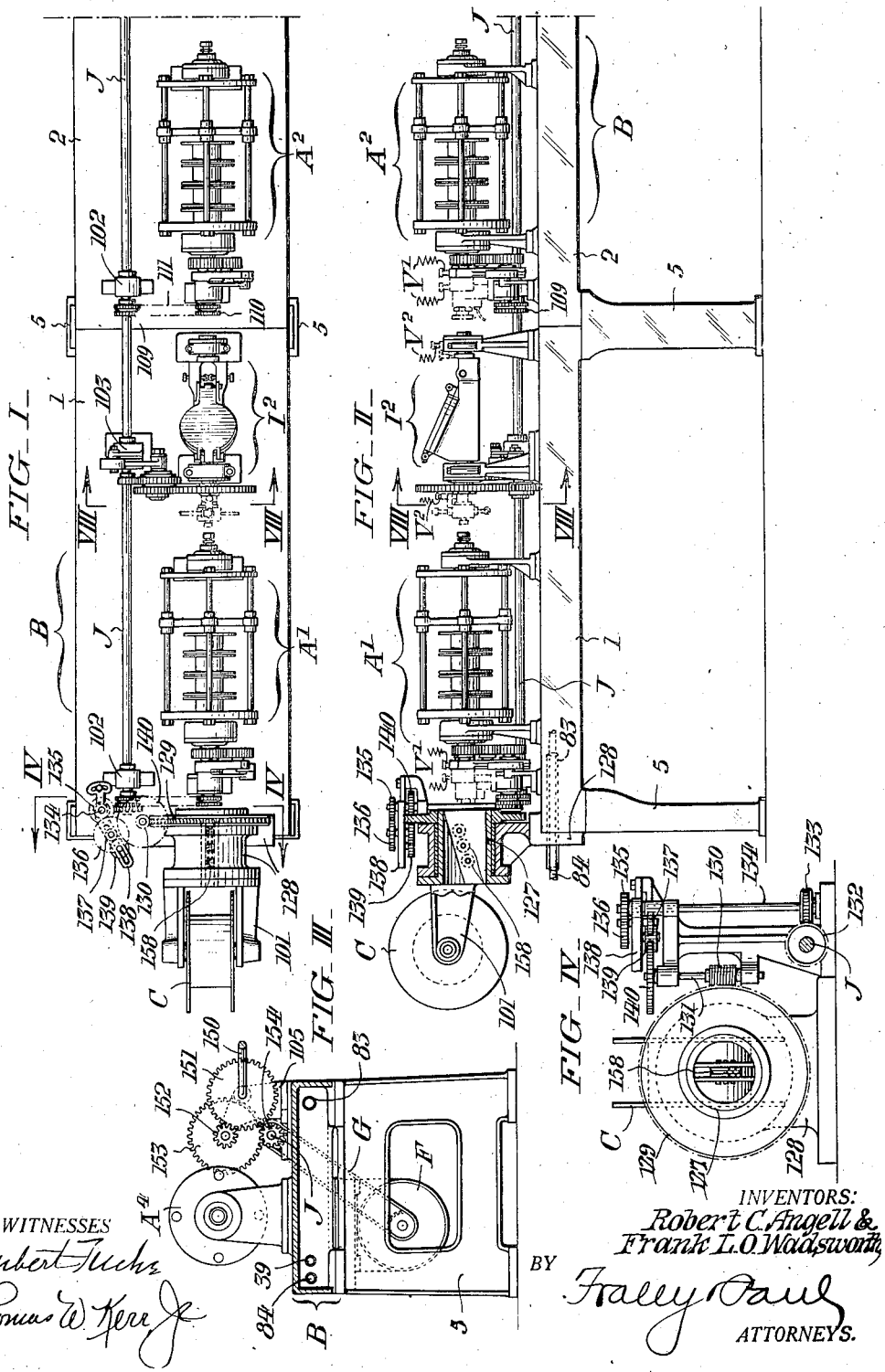

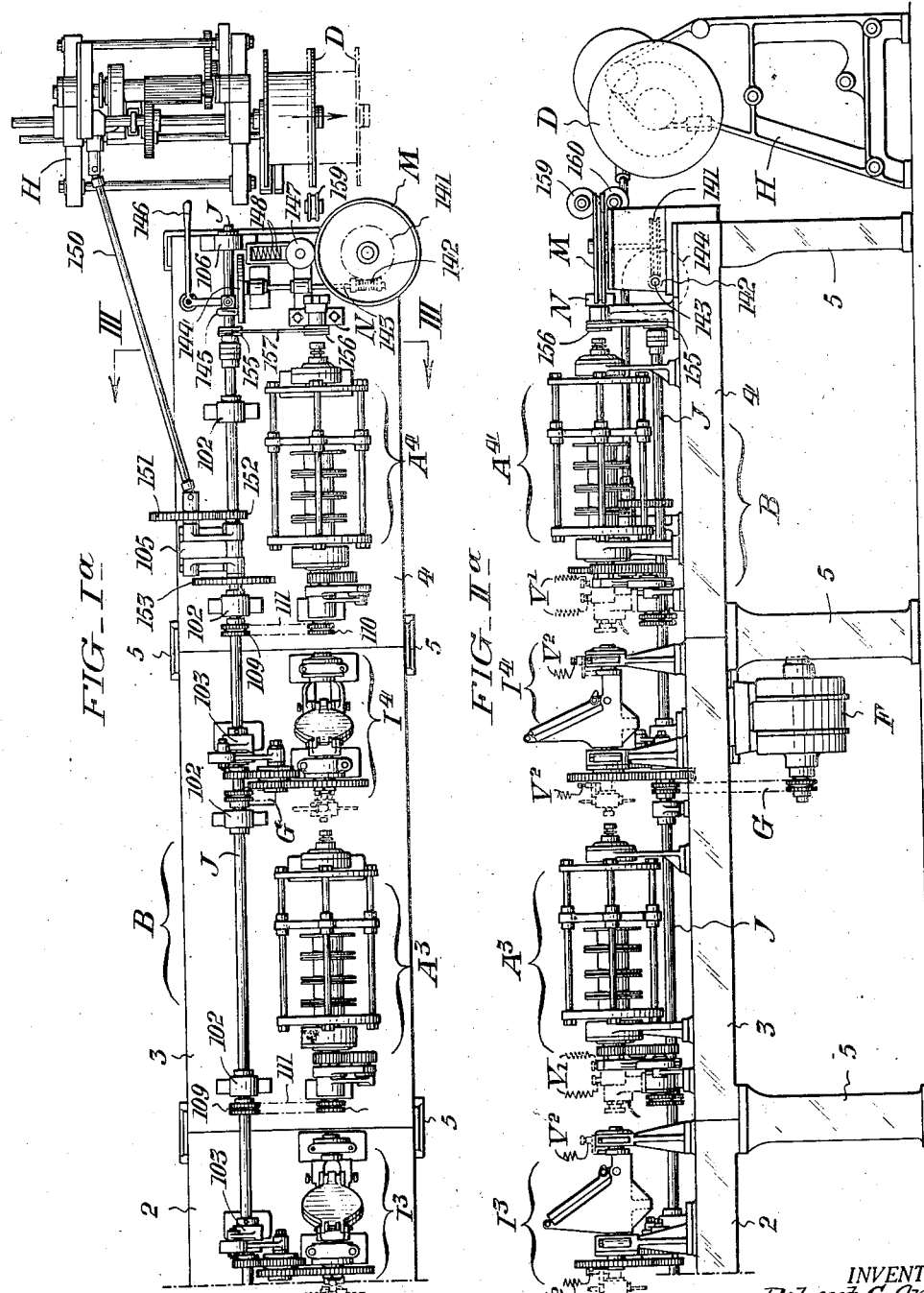

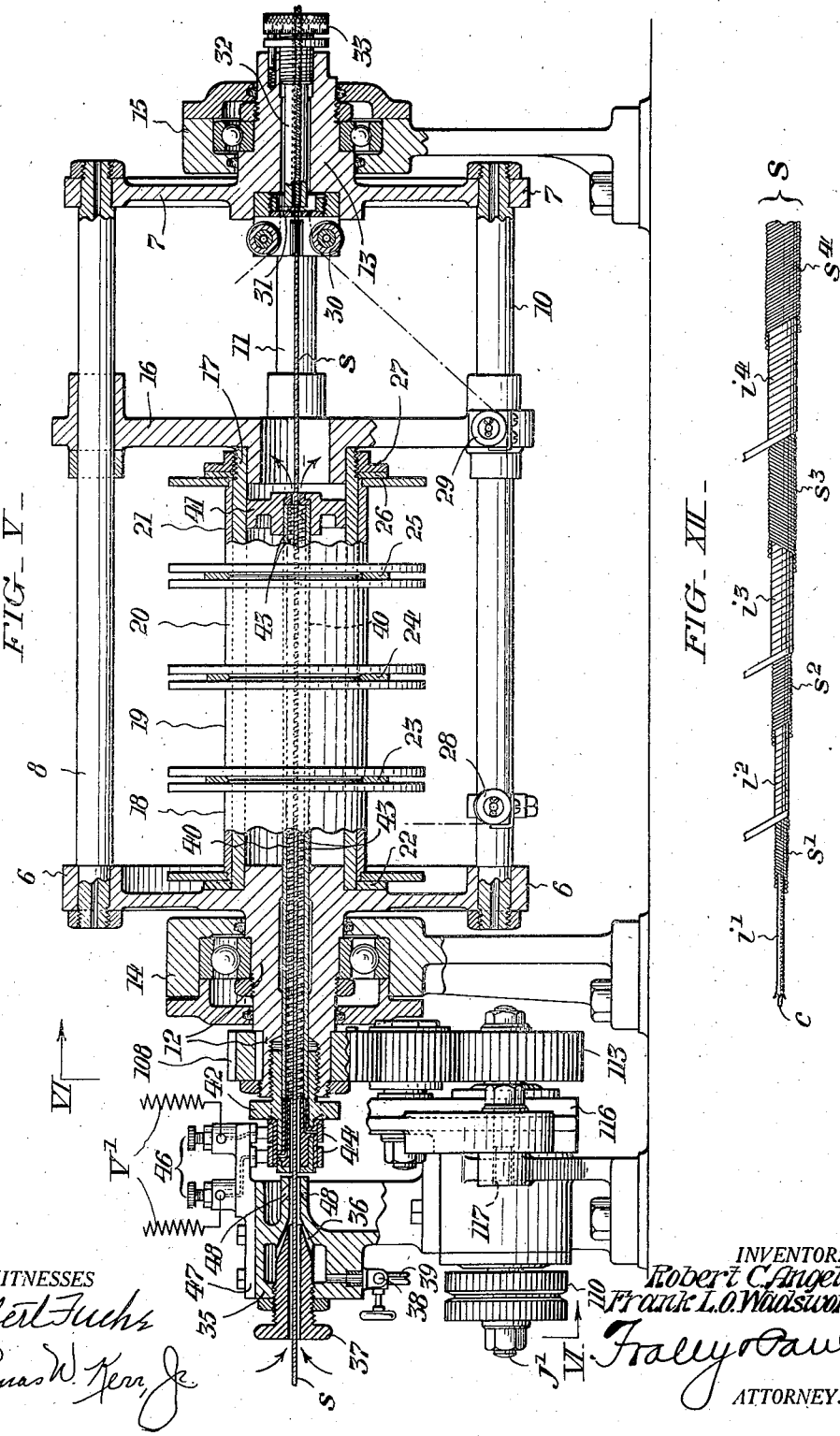

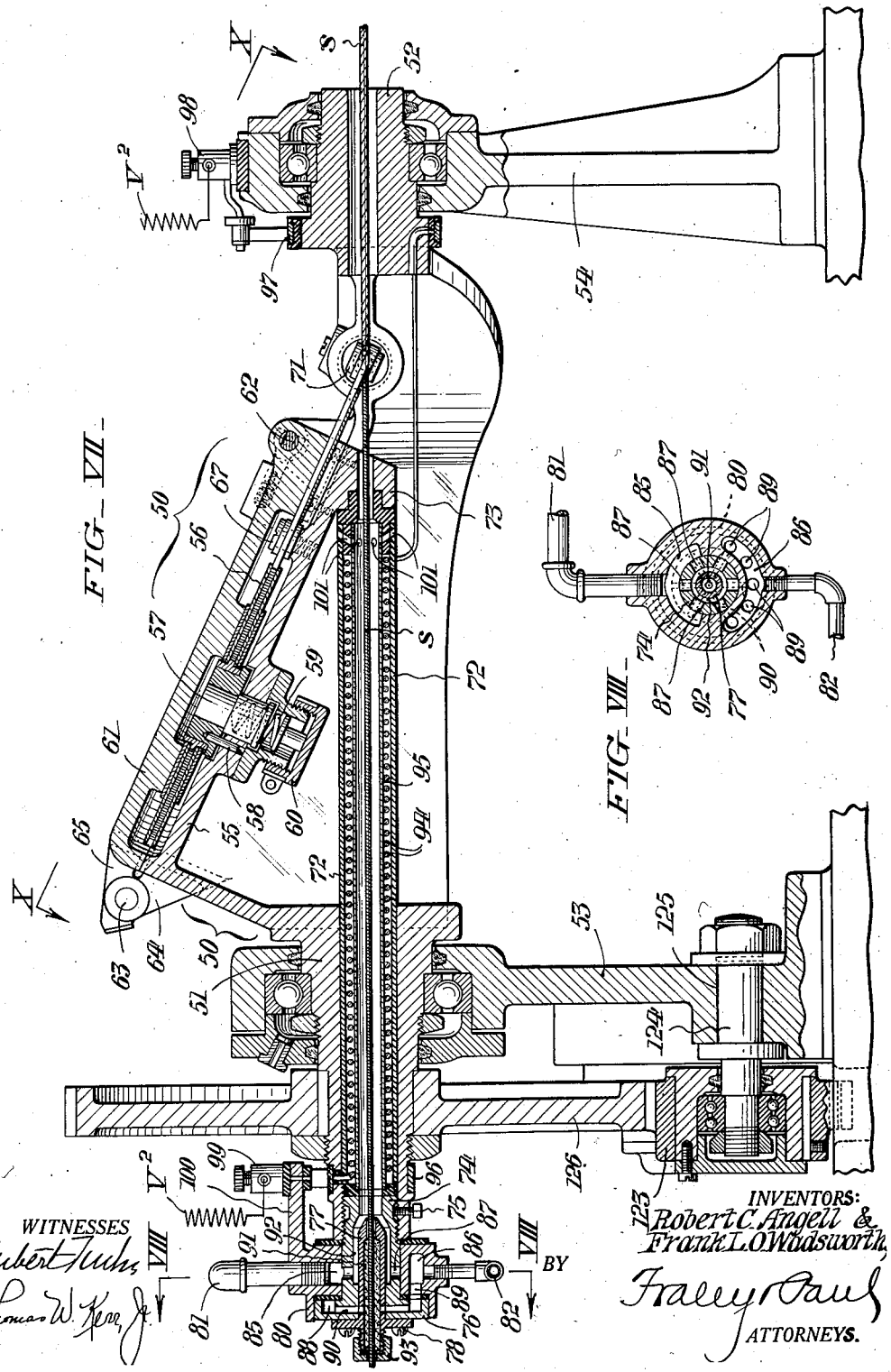

July 2, 1935.  R. C. ANGELL ET AL  2,006,333
FABRICATION OF FLEXIBLE SHAFTING
Filed March 24, 1931  7 Sheets-Sheet 6
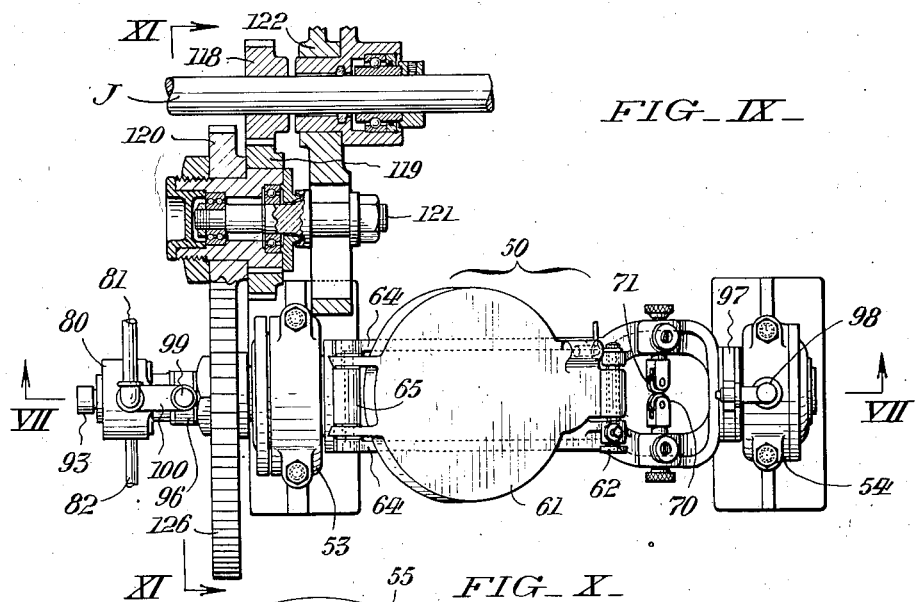
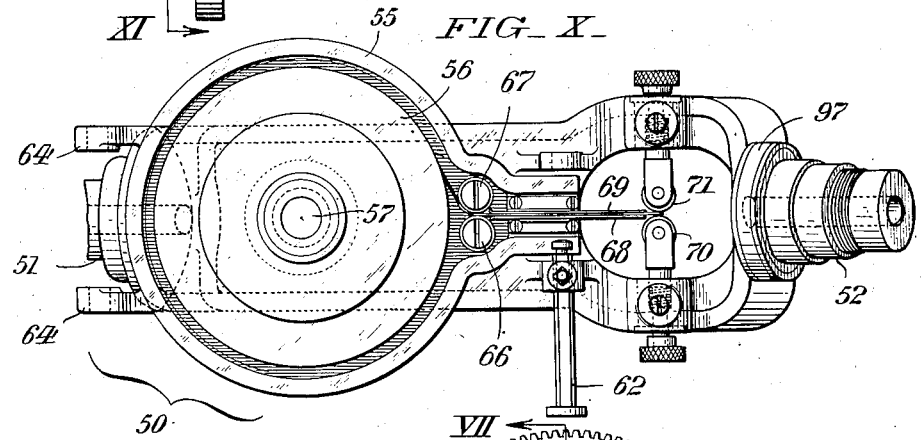
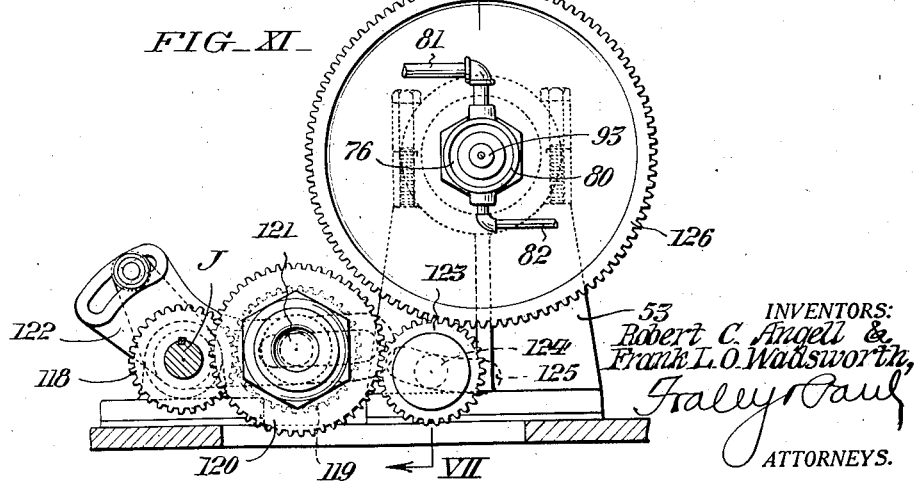

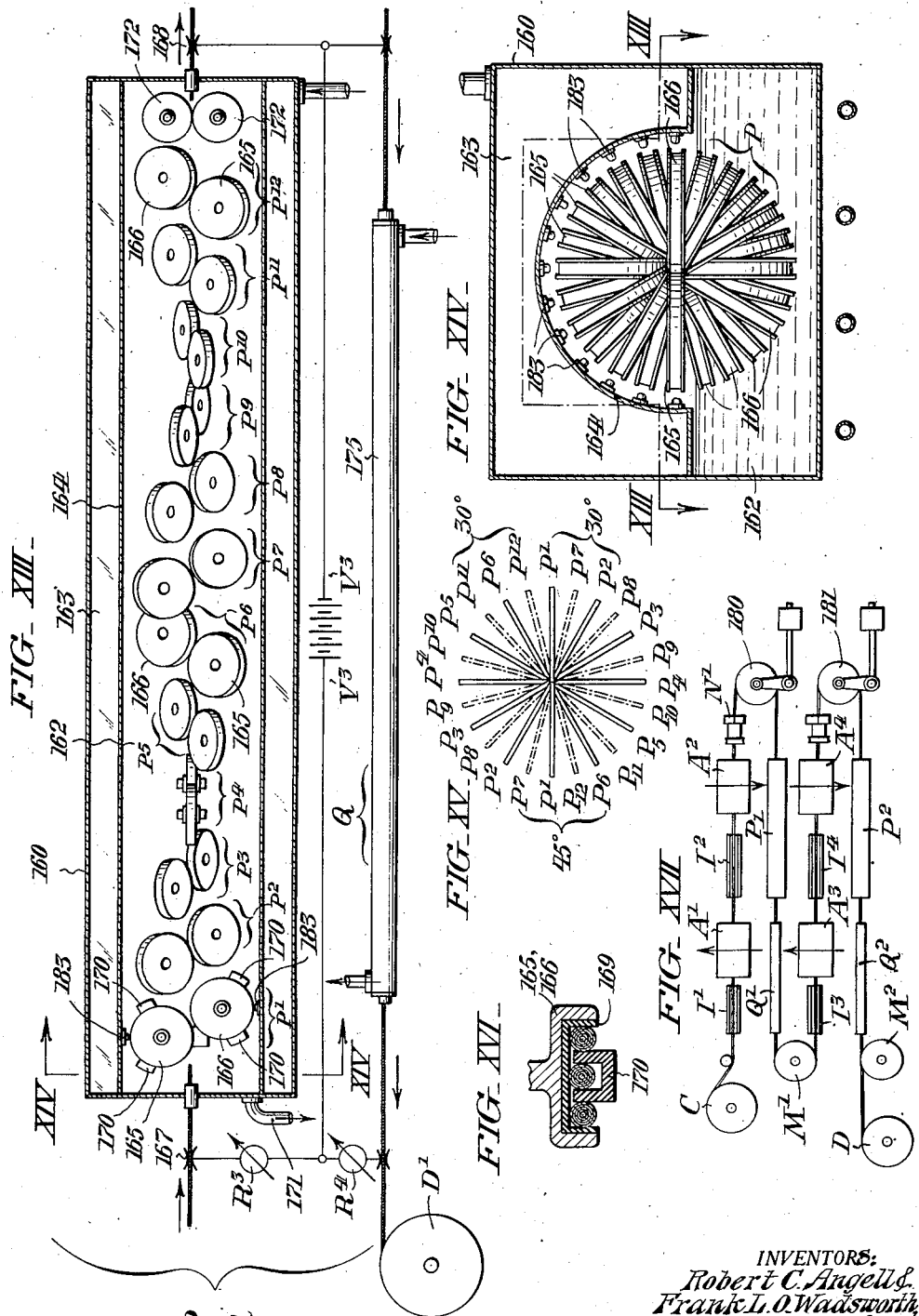

Patented July 2, 1935

2,006,333

UNITED STATES PATENT OFFICE 2,006,333

FABRICATION OF FLEXIBLE SHAFTING

Robert C. Angell, Prince Bay, N. Y., and Frank L. O. Wadsworth, Pittsburgh, Pa., assignors to The S. S. White Dental Manufacturing Company, a corporation of Pennsylvania Application March 24, 1931, Serial No. 524,880

21 Claims. (Cl. 117—34)

Our invention relates to the fabrication of flexible shafting, which is made up of a central core body—which may consist either of a single straight wire of any desired cross section, or of a bundle of such wires arranged in any desired relationship to each other—and one or more helically wound layers of strand wire superimposed thereon to form an elastic torque-resisting body capable of transmitting power when used in a bent or curved condition, without undue internal frictional losses resulting from the rubbing together of the contiguous elements of the fabricated shafting. As ordinarily manufactured, shafting of this character is constructed by winding each layer of wire in direct contact with the underlying body; and the tension imposed on the strand wires during this winding operation is so great that the initial pressure engagement between the superimposed wire elements, must be relieved by some subsequent treatment before the body thus produced can be effectively, or efficiently used for the purposes for which it is designed.

One of the important objects of our present invention is to prevent a detrimental amount of contact engagement between the wire elements forming the core body and the strand wire wound thereon during the fabrication of the shafting—and also between each successively added layer (where more than one is used) and the previously wound section; and we accomplish this object by introducing between the juxtaposed wire elements an intervening or "spacer" film of impermanent or inert material which is of such composition as to enable it to be readily removed from the finished product, or is of such a nature as to permit its retention therein without sensibly interfering with the use of the composite body as flexible shafting.

Accordingly, to prevent this detrimental pressure contact we apply to one or more of the wire elements, before or during the process of fabrication a layer, coating, plating, or film of a material of sufficient substance to create space between the layers, but of such a character that it may be worn away, dissipated, dissolved or destroyed in whole or in part, thereby, to a corresponding extent, lessening the initial pressure contact. Such film may be a coating as of gelatine, shellac or enamel, or a plating of volatilizable material such as cadmium, zinc, etc., or it may be an applied strip or ribbon of paper cellophane or metal foil, but these materials are mentioned by way of example and not by way of limitation.

Another purpose of our present improvements is to provide means for the automatic fabrication of composite flexible shafting, of the character just described, in continuous lengths—e. g. in lengths of a thousand feet or more—in a rapid and economical manner.

A further object of this invention is to provide an apparatus for the manufacture of composite multi-layer shafting in one uninterrupted operation—i. e. an operation in which all of the successively wound layers of wire, and all of the intervening or spacer films, introduced therebetween, are concurrently applied in progressively superimposed order and relationship, and the completed product is delivered from the machine in a suitable condition either for immediate use, or for the subsequent special treatments to which other forms of flexible shafting are frequently subjected.

Still another purpose of these improvements is to provide, in certain cases, for either the complete or the partial elimination or removal of the spacer films prior to the commercial employment of the flexible shafting for torque transmitting purposes, or for other applications; and to likewise, provide, in this connection, a simple and effective means for such removal.

Additional purposes and objects of the procedure and of the apparatus herein set forth, will be made apparent, to those skilled in this art, by the following description of methods and machines which may be used in the practice of our invention.

In the accompanying drawings—which present several exemplary embodiments of our preferred procedure,—Figs. I and Ia, taken together show a general plan view of a four stage machine for producing four layer flexible shafting; and Figs. II and IIa, taken together present a side elevation (partly in section) of this same apparatus; certain parts being omitted from these general figures for the purpose of avoiding undue complexity of illustration.

Fig. III is a partial cross sectional elevation of the apparatus on the plane indicated by the arrows III—III in Fig. Ia;

Fig. IV is another end elevation of another portion of the machine as indicated by the arrows IV—IV of Fig. I;

Fig. V is an enlarged illustration—partly in side elevation and partly in central longitudinal section—of one of the winding head and spacer units which forms a part of the general assembly shown in Figs. I—Ia; and Fig. VI is a rear end view of this unit with the spacer device removed.

Fig. VII is a vertical longitudinal section—on the interrupted plane VII—VII of Fig. XI—of another device for applying a composite spacer film, or layer, to one of the wound sections of the partially fabricated product;

Fig. VIII is a cross section view on the plane VIII—VIII of Fig. VII;

Fig. IX is a partially sectioned plan of the construction shown in Fig. VII;

Fig. X is a top view—as indicated by the arrows XX of Fig. VII—of a part of this same construction;

Fig. XI is an end elevation of the spacer head, as indicated by the arrows XI—XI of Fig. IX;

Fig. XII is a general side view of the several sections of the fabricated product as they are produced in progressive order by the operation of the successive spacer and winding instrumentalities shown in Figs. I—Ia and II—IIa;

Fig. XIII is a semi-diagrammatic plan view of a part of the apparatus which we may use, in conjunction with the mechanical assembly of Figs. I to IIa, for the subsequent treatment of the shafting fabricated thereby; Fig. XIV is a sectional end elevation of this apparatus on the plane XIV—XIV of Fig. XIII; Fig. XV is a diagram showing the relative angular disposition of certain elements of the same apparatus; Fig. XVI is an enlarged sectional view of a portion of one of those elements; and Fig. XVII is a general outline of a combination of the apparatus shown in Figs. I—Ia and XIII.

The form of apparatus which is illustrated in Figs. I—Ia, II—IIa, comprises four combination winding and spacer units, $A^1$, $A^2$, $A^3$, $A^4$, which are arranged in "straight away" or tandem relationship; and three auxiliary or supplemental spacer units, $I^2$, $I^3$, and $I^4$, which are positioned in the successive intervals between the heads $A^1$—$A^2$, $A^2$—$A^3$ and $A^3$—$A^4$. These units are all mounted on a common bed or table B, which is preferably made up of a series of sections 1, 2, 3 and 4 that are rigidly bolted together, end to end, and are supported, at their points of union, by suitable floor pedestals 5—5—5 etc. The entrance end of the machine is provided with a reel, C, which carries a supply of the material that forms the central core element on which the successive superimposed layers of strand wire are progressively wound by the concurrent operation of the winding units $A^1$, $A^2$, $A^3$, and $A^4$. At the opposite or discharge end of the machine there is a draft capstan or drum, M, which acts to draw the product through the winding units, and deliver it to a take-up spool D on which it is reeled up in a continuous length. N indicates a high speed rotary swager of the Dayton type, which is interposed between the draft capstan, M, and the last winding unit $A^4$, and which may be used, when desired, for "setting" the material in the last applied outer layer, thus reducing its tendency to kink and to open up when the finished product is cut up into short lengths.

All of the winding units $A^1$, $A^2$, $A^3$ and $A^4$ are of the same general construction; and, as shown in Figs. V and VI, each of these units comprises a pair of end heads 6 and 7, which are held in spaced relation by the four rods 8, 9, 10, 11, and which are provided with trunnion extensions 12 and 13, that are revolvably mounted in pedestal bearings 14 and 15. A third intermediate head 16 is slidably mounted on the rods 8, 9, 10, 11; and a tubular sleeve 17 is detachably interposed between, and supported on, the adjacent hub portions of the heads 6 and 16. This sleeve serves to support the strand wire bobbins, 18, 19, 20 and 21, which are adapted to revolve and slide freely on the surface of the sleeve, and are held in spaced relation between the heads 6 and 16, by the elastic washers 22, 23, 24, 25 and 26, and the adjustable threaded collar 27. The end washers 22 and 26 are respectively held in fixed relation to the head 6 and the collar 27; and the intermediate washers 23, 24 and 25 are provided with keys which permit them to move axially on the sleeve 17 but which hold them against rotation thereon. The wire carried by each bobbin is led therefrom over a set of guide pulleys (e. g. 28, 29, 30) to a suitable winding plate 31, that directs it to the underbody ($c$, $s^1$, $s^2$, $s^3$ etc.) on which it is wound by the rotation of the head. The tension applied to the strand wire at the point of winding can be varied by a sleeve member 32, whose inner end engages with these wires, and whose position, with respect to the plate 31, can be adjusted by means of the graduated head 33. The tension imposed on the portions of the strand wire, in the rear of the winding plate, can also be varied by adjusting the threaded collar 27 so as to alter the frictional pressure engagement between the faces of the spools, 18, 19, 20 and 21, and the elastic washers, 22, 23, 24, 25 and 26.

Each of these winding units is also provided with means for applying a spacer film to the portion of the shaft section which is passing through the unit. In the form shown in Fig. V this film forming device comprises a hollow head member 35, that is provided, at its discharge end, with a conical orifice 36, forming also a valve seat, the amount of fluid discharged through the orifice being controlled by an adjustable conical valve 37. The cavity in the member 35 is connected, by a conduit 38, with a pump or storage line, 39, which is adapted to furnish a constant supply of suitable liquid, under a controllable pressure.

The journal extension 12 of the winding head member 6 is bored out to receive a tube 40 of bakelite, or other suitable insulating material, which is supported at its forward end in a block 41, carried by the sleeve 17, and is removably held in position in the head by the annular threaded cap 42. This tube contains a heating coil 43, of high resistance wire, which is connected, at its ends, to the two insulated collector rings, 44, 44, that are mounted on the cap 42; and current may be supplied to the coil, from a suitable electric circuit $V^1$, through the binding post and brush connections, 46, that are carried, as a removable unit, on the fiber block 47.

This construction permits any, or all of the parts of the spacer film mechanism to be readily removed from the winding mechanism for inspection or cleaning or repair; and also permits each winding unit to be used either with or without the above described spacer film appliances.

The three auxiliary or supplemental spacer units $I^2$, $I^3$, and $I^4$, are all alike—except as to minor details of form—and only one of these need therefore be described in detail. As illustrated in Figs. VII to XI inclusive, these units comprise a V-shaped head, 50, which is provided with end journals, 51 and 52, that are substantially in line with one leg of the V frame, and are revolvably mounted in the pedestal bearings 53 and 54. The axially inclined arm of this revolvable V member is laterally expanded to form a shallow circular receptacle or box, 55, which is adapted to receive a short, and relatively large reel, 56, that is mounted to revolve on the enlarged hub portion of the central stud pin 57. The hub and stud pin assembly are prevented from rotating by the offset pin 58, but they are capable of axial movement in the box and are normally pushed outwardly by a compression spring 59 whose tension can be adjusted by the threaded screw cap 60. The receptacle 55 is provided with a cover member 61, which is pivotally connected thereto by the removable hinge pin 62; and which can be locked in closed position thereon by a bolt 63 that passes through opposed lugs 64 and 65 on the box and cover members. When the cover is closed the spring 59 presses the outer side of the reel 56 against the inner side of the cover 61 and thus imposes a frictional retardation on the rotation of the reel.

The rotatable spool or reel 56 is designed to carry a great length of narrow and very thin ribbon or strip of foil or other material, which is led from the reel through the two direction rolls 66 and 67 and between the two flat guide plates 68, 69, and thence through a second pair of yieldingly mounted and angularly adjustable "laying rolls" 70, 71; and is applied to the element of the shafting,—(which is traveling through the hollow trunnions of the revolving reel box frame 50)—in angular relation to its axis in the form of a thin, smooth spirally wound film or sheath ($i^2$, $i^3$, or $i^4$) that is adapted to receive the succeeding superimposed layer of strand wire laid thereon by the next winding unit A.

The three spacer units I², I³ and I⁴ are also preferably provided with complemental film applying devices, similar, in many respects, to those which form a part of the four winding units, A¹, A², A³ and A⁴, (see Fig. V). These complemental film forming appliances each comprise a sleeve member 72 which is centrally mounted in the trunnion extension 51 of the revolvable frame 50, and which extends forwardly to a supporting boss 73 on the inner arm or leg of this U-shaped frame. This sleeve is removably held in position by a hollow nipple member 74 which is threaded into the projecting end of the trunnion 51, and is clamped therein by a set screw 75. The member 74 is provided with an enlarged flange portion 76 which carries an inner nipple, 77, that is centrally perforated to permit of the passage of the shafting element ($s^1$, $s^2$ or $s^3$), and is held in registered position on the flange 76 by the screws 78. A double chambered head 80 is rotatably mounted on the cylindrical barrel of the nipple member 74, between the end of the trunnion extension 51 and the flange 76; and is held against angular movement by the fixed pipe connections 81, 82 which extend from the head, 80, to suitable supply conduits 83, 84 that are most conveniently positioned in the bed B of the machine (see Fig. III). The pipe 81 leads to the upper segmental chamber 85 of the head 80, and the pipe 82 leads into the lower segmental chamber 86 of the said head. The upper chamber 85 is in communication with the annular opening 92 between the two concentric nipple members 74 and 77 through the ring of radial ports or perforations, 87, 87 etc. that are formed in the wall of the outer nipple sleeve 74; and the lower chamber 86 communicates with the central opening in the inner nipple, 77, through the annular groove 88 in the face of the flange 76 and the two rings of axial and radial ports 89 and 90 which are respectively formed in the side of the head 80 and in the registered portions of the concentric parts 76, 77. The opening in the inner nipple, 77 which rotates around the shaft section s, is preferably utilized to hold a porous plug, 91, of some semi-elastic material, such as compressed felt or a roll of fine wire gauze which is adjustably held in position by an end cap 93, and is provided with a central perforation of substantially the same size as the shaft section, s, that passes therethrough.

The tube or sleeve 72 contains a heating coil 94, which is protected by a thin inner lining or tube, 95, of mica, or other suitable material; and which is connected, at one end, to the collector ring 96 on the trunnion extension 51, and, at the other end, to another collector ring 97 on the front trunnion member 52. Current is supplied to the coil from the electric circuit V²—V², through stationary brush and binding post members 98 and 99, that are supported respectively on the pedestal bearing, 54, and on a bracket 100 which forms a part of the chambered head 80.

The power for driving the various units A¹, A², A³, A⁴, I², I³, I⁴, C, D, M and N may be conveniently supplied by a single motor, F, which is mounted near the center of the machine, and is connected, by a flexible chain drive, G, with a jack shaft, J, that extends the entire length of the bed B. This shaft is rotatably supported at the proper intervals by pedestal bearings 102, 103, 105, 106 etc., and is coupled to the various units that are driven thereby by trains of gearing which will now be described.

The rear end trunnion, 12, of each revolvable winding head is provided with a spur gear 108 which is detachably secured thereto by a key and lock nut of the usual form (see Fig. V); and the jack shaft, J, is connected to this gear (108) by means of a change speed transmission train that comprises the sprocket wheels 109, 110; the chain 111; the short jack shaft J¹, (which is keyed at one end to the sprocket 110, and carries at the other end the removable gear 113); and the two intermediate idle pinions, 114 and 115, which are mounted on short stud bolts that may be clamped, in any desired position, in the slotted arm of an adjustable bracket 116. The speed of revolution of the winding head can be readily changed (relatively to that of the driving shaft J) by removing either the sprocket wheel 110, or the gear 109, or the gear 113; (or any two or all of them), and replacing it (or them) with other gears of different sizes; and the direction of revolution of this head may be reversed by removing either of the idle pinions, 114 or 115, and bringing the remaining one into connective engagement with the gears 108 and 113. This may be readily done by shifting the stud bolt supports for these pinions in the slotted arm of the bracket 116 and rocking the latter about its pivot support on the axis of the shaft J¹. When the parts have thus been brought to the proper position the bracket is locked to the pedestal bearing by means of the nut and bolt 117.

The driving train for operating the revolvable reel frames I², I³ and I⁴ comprises a driving pinion 118 which is keyed to the jack shaft J; a pair of gears 119 and 120 which are secured together, and revolve as a unit on the stud bolt member 121, that is adjustably clamped in the slotted arm of a rocking bracket 122; an idle transmission gear 123 which is mounted on a stud bolt 124 that can be moved, to any desired position in an arcuate slot 125 that is formed in the base of the pedestal 53; and a large spur gear 126 which is detachably secured to the end of the trunnion extension, 51, of the revolvable reel frame 50. By changing the relative sizes of the gears 119 and 120, and correspondingly resetting the stud bolt units 121 and 124 in their respective slots (and correspondingly adjusting the swinging arm 122 about its axial support on the jack shaft J); the speed of the revolution of the winding reel frame may be increased or decreased; and by removing the idle pinion 123 and swinging the bracket 122 until the teeth of the gear 120 engage directly with the gear 126, the direction of rotation of this frame can be reversed. These adjustments permit the strip material which is drawn from the reel 56 to be wound upon the shafting element in either a right hand or left hand helix, and also enables this winding to be made with any desired spacing between the successive turns of the helically applied layer;—it being generally desirable to leave an interval of a few thousandths of an inch between adjacent or contiguous edges of the successive turns in order to avoid irregularities that might be caused by the occasional overlapping of these edges.

The core reel, C, which is positioned at the entrance end of the machine, is preferably mounted on a frame 101 which can be revolved about the axis of the core body, in order that the core wire may be given an initial twist before the first wire layer is applied thereto by the winding unit $A^1$. In order that this may be done the frame 101 is provided with a large hollow trunnion extension 127 which is revolvably supported in the bracket 128 that is bolted to the first section 1 of the bed frame B. The forward end of this trunnion member is provided with a large worm wheel 129 which is engaged by a worm 130 that is mounted on the vertical shaft 131. The train of gearing which transmits movement from the jack shaft J to the worm shaft 131 comprises a pair of helical gears 132 and 133, that are respectively secured to the jack shaft J and a vertical shaft 134; a spur gear 135 which is keyed to the upper end of the shaft 134; a pair of change gears 136 and 137, which are respectively secured to the upper and lower ends of a short stud shaft whose bearing can be adjusted in the slotted arm of a swinging bracket 138; an idle transmission gear 139, whose stud shaft bearing is also adjustable in the bracket arm 138; and a driving gear 140 which is secured to the upper end of the shaft 131. The speed of rotation of the core reel frame may be changed by varying the relative sizes of the two change gears 136 and 137, or the size of the driving gear 140; and the direction of rotation of the frame may be reversed by removing the idle pinion 139 and bringing the pinion 137 into direct engagement with the gear 140.

The draft capstan M is driven from the jack shaft J by a train of gearing which comprises a worm wheel 141, which is mounted at the lower end of the vertical shaft support for the capstan drum; a worm 142 which engages with the worm wheel 141; a cross shaft 143 to which the worm 142 is secured; a disk 144 which is keyed to the opposite end of the shaft 143; and a driving roll 145 which is frictionally engaged with the face of the disk 144. This driving element 145 is splined to the jack shaft J and can be moved axially of the latter by means of the manually operated bell crank lever 146, so as to engage with the disk 144 at varying distances from its axis of revolution, and thus change the speed of revolution of the capstan drum M. The pedestal frame which supports this drum is also preferably provided with a sliding block which carries a plain faced drum 147 that is held in pressure engagement with the coils of shafting that pass around the capstan drum M by means of the compression spring 148.

The take-up reel D is preferably mounted on a separate floor stand H, so that it can be placed at any desired distance from the discharge end of the machine. The construction of this take-up reel frame is of usual form and, since it forms no part of our invention, it will not be specifically described. The operative mechanism which imparts the desired movements to the spool D is connected to the jack shaft J by the shaft 150 and the train of reduction gears 151, 152, 153 and 154 which are all mounted on the pedestal 105 (see Fig. III).

The construction of the Dayton rotary swager, N, is well known to those skilled in this art and need not be described in detail. When this unit is used it is driven directly from the jack shaft, J, by means of the belt and pulley connections 155, 156 and 157;—the desired speed of operation being obtained by changing the size of the driven pulley 156.

In the operation of the above described apparatus the core body c is drawn from the reel C through a suitable tensioning device—(such as the staggered rolls 158 that are mounted on the hollow trunnion 127 of the core reel frame)—and is passed in succession through the series of winding units $A^1$, $A^2$, $A^3$, $A^4$, which are concurrently operated to progressively wind four successively superimposed layers of strand wire around the core body as it moves forward toward the delivery end of the machine. The successive winding heads are preferably driven in alternately reversed directions—i. e. the heads of the units $A^1$ and $A^3$ revolve in one direction and the heads of the units $A^2$ and $A^4$ revolve in the opposite direction—so as to wind the superimposed wire layers in crossed relationship to each other;—the speed of rotation of each head being so adjusted, by the selection of the proper gear and sprocket wheels, 108—113 and 110, as to wind each layer with a substantially uniform axial spacing between the successive coils of wire in that layer. The completed multi-layer shafting which is delivered from the last winding unit $A_4$ is wrapped one or more times around the draft capstan M— (which is driven at the proper velocity to produce the required axial pull on the product and progress it at the desired rate of speed through the machine, by the adjustable friction gears 144 and 145)—and is then led through the guide pulleys 159 and 160 to the take-up spool D on which it is wound up in a continuous length.

The operation as thus far described is in principle similar to that of other multi-head machines of the prior art (see for example Patent No. 1,592,909 dated July 20, 1926, to F. H. Sleeper); but the additional features of our procedure, which will now be considered, are quite different from those of any other practice with which we are familiar, and constitute the distinguishing characteristics of our present improvements.

One of these additional features is the imparting of an initial predetermined twist or torsional strain to the core body prior to the application of the first layer of strand wire thereto. In order to explain the purpose and result of this step it will be desirable to briefly consider certain conditions which are encountered in the manufacture of flexible shafting.

The strand wires of flexible shafting are usually applied to the underlying layers or core at a pitch angle of less than 45 degrees, with the result that these strand wires exert but slight resistance to any longitudinal tension which may be put upon the shafting, but on the other hand are capable of transmitting heavy torque. This is in sharp contrast to the wire rope or cable art in which strands are laid at a greater pitch angle to the longitudinal axis of the rope or cable because it is necessary to distribute strains of tension equally among all of the components.

The material ordinarily used in the fabrication of this product is a high-carbon hard-drawn steel wire; and the winding of such material into coils of relatively small diameter imposes very great stresses and strains on the outer portions of the wire. By reason of the small pitch angle at which the strands of this steel wire are applied to the core there is a much greater internal deformation involved in the application of strand wires in the manufacture of flexible shafting, than in the manufacture of wire rope or cable. It is therefore more difficult to produce flexible shafting which when cut will be inert than to produce wire rope possessing the same quality. The magnitude of these effects in flexible shafting is well illustrated by the fact that when a first layer of four strand wires of 0.013'' diameter is applied to a core of 0.017'' diameter, the outermost fibers of the strand wires are stretched or deformed to a length which is substantially more than twice that of those fibers which lie in contact with the core body; and that each strand wire may also be twisted through an angle of more than 180° in each successive turn. These combined stresses of tension, compression, and torsion impose strains on the surface and sub-surface elements of the wire which far exceed the elastic limit of the material, and which therefore produce a large amount of permanent "set", that tends to retain the body in its fabricated form. But there is also a substantial amount of residual resiliency, or unbalanced stress, in the distorted material which tends to exert itself when the end restraint on the fabricated body is removed; and this may result in a twisting or kinking of the shaft when it is removed from the take-up spool, or more particularly when sections are cut free from the continuous length. When the successive layers of strand wire are wound in opposite directions, the unrelieved stresses and strains in one layer tend to counteract those in adjacent layers; and if the combined twisting tendencies of the first and third layers could be made to exactly balance the opposite twisting tendencies of the second and fourth layers, the shafting would remain straight when the tension thereon is released. But this cannot, as a rule, be accomplished; because the residual unrelieved strains are generally much greater in the inner small diameter coils—(in which the material is most severely stressed by the winding operation)—than they are in the larger outer coils. A certain approach or approximation to the desired interbalanced condition, of the several superimposed layers, may be achieved by progressively increasing the diameter of the strand wires in each successively applied layer—or by progressively altering the physical character of the strand wire material—but this procedure introduces other problems in the manufacture of shafting in continuous lengths, and produces other changes in the operative characteristics of the finished product, which it is desirable to avoid.

The initial twisting of the core body, prior to the application of the first helically wound layer of wire thereto, introduces another component of unrelieved stress in the central element of the completed multi-layer shaft; and by altering the amount and direction of the torsional twist initially imposed on the core, (which we effect by suitably adjusting the elements of the gear train 135 to 140), this added component may be made to substantially balance, or compensate, the sum of the unrelieved stresses in the superimposed layers of strand wire—whatever may be the number of such layers (e. g. one, two, three, four, or more)—and thus produce a finished shaft which will remain straight when it is removed from the take-up spool and cut up into shorter lengths.

The beneficial effect which we thus obtain by revolving the core reel frame in the proper synchronism with the preadjusted velocities of rotation of the several concurrently operating winding heads and the controlled rate of progression of the product therethrough, (as determined and regulated by the individual adjustments of the several driving trains of the units $A^1$, $A^2$, $A^3$, $A^4$ and M), can be supplemented, if desired, by the use of swaging unit, N, and the compressing roll 147,—which coact to further "set" the stressed fibers on the opposed surfaces of the last applied layer of strand wire, and thus relieve to a considerable extent the tendency of those fibers to produce a twisting and a partial uncoiling of this layer when the restraint on its end portions is removed.

Another special feature of our herein described procedure is the introduction of a series of spacing films between the adjacent or contiguous surfaces of successively superimposed elements of the fabricated product. In the practice of our invention, this operation, or rather this series of steps, may be carried on concurrently with the winding of the progressively applied layers of strand wire; and we have provided various alternative forms of apparatus for applying these spacing films in various ways. The mode of operation of these different instrumentalities will now be described.

When the revolving reel frames of the spacing units, $I^2$, $I^3$, $I^4$, are employed to apply a helically wound ribbon of material to the surfaces of the first three helical layers of strand wire (this mode of forming the spacing films being preferably used when the diameters of the strand wires are relatively large) the core wire c is preferably provided with a thin film $i^1$ of silk or cotton or paper, which may be applied thereto in the same manner in which an insulation is ordinarily applied to other wires, while the core wire is being spooled on its reel. The first layer of strand wires $s^1$ is wound on this covered core wire and the product becomes a new core body or member and is then provided with a second spacing film, $i^2$, of helically wound ribbon material as it passes through the unit $I^2$. This covered section passes in turn to the second winding unit $A^2$ where a second layer of strand wire $s^2$ is wound thereon. A third spacing film, $i^3$, is next applied as the two layer product or core body passes through the unit $I^3$; and the succeeding layer of strand wire $s^3$ is wound on the second covered section by the action of the winding unit $A^3$. The final spacing film, $i^4$, is applied to the outer surface of the three layer product or core body which is passing through the unit I³; and the final layer of strand wire s⁴ is applied by the unit A⁴. As previously stated the spirally wound layer of ribbon material which forms the last three spacing films may be of any suitable character—e. g. tissue paper, silk cloth, cellophane, various metal foils such as tin, zinc, cadmium, solder, fusible metal or some form of thin adhesive tape—the thickness of the material being varied to correspond with the diameters of the strand wires, and the conditions of winding. The tension which must be applied to the strand wires, in coiling them around the underlying body, will necessarily produce a substantial amount of pressure on the surfaces of the spacer films; and this pressure will result in decreasing the thickness of the said films at the points where the turns of the successive layers cross each other; so that the resultant radial separation of the superposed wire elements will be somewhat less than the initial thickness of the intervening film material. If high winding tensions are employed it will therefore be necessary to use a film or layer of spacer material which is considerably thicker than is required with a lesser winding tension; and this circumstance must be taken into account in determining both the thickness and the character of the spacing ribbons, or tapes that are used in the above described procedure.

In the use of the spacing film appliance which is illustrated in Fig. V,—(and in the use of the analogous type of device that forms the central portion of the apparatus shown in Figs. VII to XI inclusive)—the spacing films are applied by coating the surface of the core wire—or one of the helically applied wire layers—with a relatively strong solution or liquid emulsion of some material, such as gelatine, casein, celluloid, bakelite, paint, varnish, shellac, "Duco", or similar compounds; and then evaporating the solvent or the carrying liquid, so as to leave a thin, hard adherent coat of solid material on the said surface. The rapid removal of the liquid constituent of the coating is facilitated and accelerated by passing the coated body through the electrically heated tubes 40 (or 72); and the effects of this heating may be further increased, if desired, by passing a current of electricity through the shaft body itself.

In the form of apparatus shown in Fig. V, the solution or emulsion of film forming material is supplied to the hollow head 35, through the pipe connections 38, 39; and is projected, in a thin annular jet, through the conical orifice 36, whose area of opening can be adjustably controlled by the needle valve element 37. The volume and the form of this jet delivery can be so regulated that a minimum amount of the solution is projected into the interstices of the helically wound coils, and the larger proportion of the discharge is directed against, and is retained on, the outermost portions of the wire layers.

The action of the forwardly projected jet, combined with the advancing movement of the shaft body, also serves to induce a continuous flow of air through the openings 48, at the entrance end of the drying tube to the orifice at the discharge end thereof, and thereby assists in the rapid and continuous removal of the vaporized constituents of the liquid coating.

In the form of apparatus shown in Figs. VII to XI inclusive, the solution or emulsion of coating material is introduced through the pipe connections 84, 82, to the central annular orifice which contains the annular pad, 91, of porous material. The inner surface of this material is preferably just out of contact with the periphery of the shafting element which is passing therethrough; and a thin film of the solution is wiped off from the saturated pad and is deposited on the outermost portions of the wire coils by capillary action. This apparatus is also provided with an electrically heated drying tube 72; and is further provided with auxiliary means for producing a positive flow of compressed gas or vapor through the said tube. This latter means comprises the pipe connections 83, 81 which supply the compressed air or vapor to the upper chamber 85, of the stationary head 80, and deliver it through the port connections 87 and the annular opening 92 to the entrance end of the heated tube 72, 95. The current of gas or vapor which passes through the tube 95 escapes from the discharge end thereof through the inclined openings 101, 101;—this escape being facilitated and accelerated by the centrifugal fan action of the revolving frame. The gas or vapor which is thus forced through the drying tube may be itself heated prior to its introduction therein; and it may be of such a nature as to combine chemically with the material which is dissolved or suspended in the liquid coating, and thereby increase the thickness or the hardness or the adhesive qualities of the dried spacing film. Another gaseous material which can, in certain cases, be used to great advantage is highly superheated steam which has a powerful desiccating effect, and also a pronounced hardening effect on films of certain material.

The heating of the successive shafting elements during the application of the spacing films in the manner last described (i. e. by the precipitation thereon of material that is applied thereto in solution or in suspension) produces a further beneficial effect, in that it tends to eliminate or equalize irregular localized stresses and strains that may exist in portions of the strand wire, or may be produced therein by intermittent variations in the conditions of winding those wires upon the underlying core body or element.

The strand wire carried on each of the strand wire bobbins may have a coating material which has been applied to it prior to being wound on the bobbins. In this case, after winding onto the composite flexible shaft each wire is separated by its coating not only from the structure on which it is wound but also from adjacent wires in the same layer by one or more spacing films. This coated strand wire may be used in conjunction with the devices for applying spacing films as shown in Figs. V and VII or without these devices.

The multi-layer fabricated shaft product which is produced in the practice of our present invention may be used in the condition in which it is delivered to, and reeled upon, the take-up spool D, or it may be subjected to the usual heat treatment and straightening or "kneading" operations that are commonly used in the treatment of similar shafts that are produced by other methods.

In the fabricated product which is delivered from the apparatus shown in Figs. I to IIa inclusive, all of the material which is used to form the intervening spacing films is still retained in position between the successively superposed elements of the shaft; and the latter is, for that reason, relatively stiff and inelastic. This lateral rigidity does not interfere with the use of the shaft as a torque transmitting member when it is used in a substantially straight, or in a slightly curved condition; but when the shaft is bent to a relatively small radius of curvature,—and used in that bent condition for power transmission— the pressure contact and the relative movements between the successively superimposed wire elements and the intervening films of spacing material will at first develop a large amount of internal friction. But after the shaft has been run a short length of time the spacing films will be worn away at the points where the wire elements of the shaft cross each other; and as soon as this condition is established the internal friction will be reduced until it is no longer objectionable, and the shaft will then continue to operate with the same degree of efficiency as it would if no intervening films were present. As a matter of fact the retention of a considerable amount of intervening film material, in the interstices between the wires, may, in some cases, be of decided advantage, particularly when this material contains a certain percentage of oily or lubricating material which can act as a lubricant. Any desired amount of such matter can, if necessary, be introduced by mixing it with the solutions or emulsions that are used to form the spacing coatings. It also happens that in most applications of flexible shafting for power transmission purposes the shafts are run in a surrounding bath of oil or grease; and in such instances a porous spacing material, such as paper, or similar cellular substances, serves to aborb the lubricant, and tends to resist or retard its expulsion from the rotating body under the effect of centrifugal force and the continuous pumping action of the rapidly reversed movements of adjacent wire coils at each half revolution of the bent shaft.

Our invention also contemplates and provides for the substantially complete removal of the intervening spacing films, when it is desired to eliminate this material before the shaft is used. This removal may be effected in various ways. Where the spacing material is of such a nature that it is easily vaporized or burned away by heat, its elimination may be almost completely accomplished by subjecting the shaft to the usual heat treating and straightening or bending operations. In this treatment the fabricated product is usually raised to a temperature of from 500° F. to 700° F. by passing an electric current through the shaft (or by passing the latter through a heated chamber); and subjecting the shafting, either before or after such heating, to the action of an ordinary form of rotary straightener or some equivalent device.

In our improved procedure we preferably modify the above described mode of treatment by subjecting the fabricated product to simultaneous heating and transverse bending operations; and we have provided, for accomplishing this object, various alternative forms of apparatus, one of which is illustrated in Figs. XIII to XVI inclusive. In the construction therein shown the shafting is drawn through a closed box 160, which is preferably divided into two compartments, or chambers, 162 and 163, by the arched partition wall 164. The lower chamber, 162 contains a number of bending units, P¹ to P¹² inclusive, each of which comprises two diametrically opposed rolls, 165, 166, that are mounted to revolve freely on suitable stud shaft bearings carried by the walls of the chamber. Each successive pair of rolls (165, 166) is positioned in a plane which is slightly inclined to that of the preceding set;— the angle of inclination between the first six units (P¹ to P⁶) and the last six units (P⁷ to P¹²) being in each case 30°, and that between the two central units (P⁶ and P⁷) being 45°. The shafting is passed one or more times around the first roll 165 of the unit P¹ in a counter-clockwise direction, then around the opposite roll 166 of this same unit in the reverse (clockwise) direction; and then successively around each roll of each succeeding unit (P² to P¹²) in the same manner. Every part of the shafting is thus subjected, in its passage through the chamber 162, to successively reversed bending actions in twelve different planes that are inclined at angles of 15° to each other. This operation is preferably carried on while the shafting is maintained at a temperature of from 500° to 700° F., either by heating the bending roll chamber, or by passing an electric current through the shafting between the points where it is engaged by the contact brushes 167 and 168. When this last mentioned means of heating is employed the peripheries of the drums 165, 166 are provided with rims of suitable insulating material 169, and the successive turns of shafting on each drum are held in laterally spaced position by grooved spacer block, 170, of similar material, so as to avoid any short circuiting between these successive turns.

When the material of the intervening films or spacing layers is of such character that it can be quickly vaporized or oxidized at the temperature at which the shafting is maintained in chamber 162, the elimination, or substantial removal, of this material can be effected by heat and atmospheric action alone; and in such cases it is only necessary to maintain a slow current of air through the box by connecting a suction fan to the outlet pipe 171. If the spacing films are formed of paper ribbon or cotton thread, or similar fibrous substances, the rapid combustion of this material in the treating box may be facilitated by passing a current of oxygen through the heated chamber 162, or by impregnating the ribbon or thread with a suitable nitrate, or nitrocellulose or hydrocarbon, compound; either prior to, or at, the time of winding it on the shaft sections. In such cases the heat of combustion of the spacer material assists in maintaining the shaft at the desired temperature of treatment.

The removal of films of soluble but non-combustible material may also be effected, during the above described thermo-mechanical treatment of the shaft, by filling the heated chamber 162 with the vapor of the solvent in which the material was dissolved in its initial application to the shafting elements. The effectiveness of the solvent action on the inner portions of the product, is increased by introducing this vapor, under a relatively high presure, into the upper compartment 163, and discharging it, through a series of nozzles 183, against the bent and opened portions of the shafting structure, which are passing around the successive pairs of rolls 165, 166. This action may be further facilitated by filling the lower portion of the bottom chamber 162 with a bath of liquid solvent, through which the shafting is carried on each of its passages around the lower set of rolls 166, 166, etc.

After the shafting has been drawn through the treating box 160—by the action of a pair of draft rolls 172—it is next passed through a drying chamber 175—which may be placed either in tandem or in parallel with the box 160—where it is subjected to the action of a current of hot dry air or other desiccating agents, (e. g. highly superheated steam), for the purpose of removing all moisture from the interstices of the fabricated product and thus eliminating the danger of subsequent rusting. The shafting itself may also be heated, during this drying operation, by an electric current, which is preferably supplied from the circuit $V^3$, $V^3$ that is connected to the brushes 167 and 168;—the flow of current through the two branches of this circuit being independently controlled, (so as to obtain the desired heating effects on the connected shaft portions), by the resistances $R^3$ and $R^4$.

In the use of these combined heating and drying units, (P and Q) the completed shafting may be led directly from the draft unit, M (see Figs. I$a$–II$a$), to the entry end of the chamber 162. In this case the take-up reel, D, is positioned at the exit end of the drying chamber 175. Or, the shafting may be first reeled up on the take-up spool D, and this spool may then be removed from the machine and mounted in another frame located in front of the treating unit P; and the shafting product which is then drawn from this spool is again reeled up on another spool $D^1$ placed at the exit end of the drying chamber Q.

Instead of fabricating the complete shafting before it is subjected to the action of the units P and Q we in some cases subject successive elements of the product, as it is being fabricated, to the action of said units (P and Q) before the succeeding superimposed layers are wound. Fig. XVII illustrates, diagrammatically, an arrangement of apparatus which is adapted to carry out this modified procedure. In this arrangement the first two layers of strand wire, together with the interposed spacing films, are applied to the core wire by the successive action of the units $I^1$, $A^1$, $I^2$, $A^2$, and the partially fabricated product is then passed around a weighted direction pulley 180 and through the combined treating and drying units $P_1$, $Q^1$, to a frictionally driven capstan $M^1$. It is then passed through the succeeding spacer and winding units $I^3$, $A^3$, $I^4$, $A^4$, to another weighted direction pulley 181, and thence through the second pair of treating and drying units $P_2$ and $Q^2$ to a second frictionally driven capstan $M^2$ that delivers it to the take-up reel D. It is also apparent that we may, if desired, interpose a pair of heating and drying units (P+Q) between each pair of successive spacing and winding units; and thus effect the removal of the spacing material from between each of the successively superimposed shafting layers before the next spacing film layer and next winding of strand wires are applied thereto.

With the preceding disclosure as a guide, other modifications of our hereinbefore described modes of procedure, and other forms of apparatus for the practice thereof, may be readily devised by those skilled in this art without departing from the spirit of our invention, as defined in the following claims which are intended to more fully express the scope of our present improvements.

Having thus described our invention, we claim:

1. The process of manufacturing flexible shafting formed by successively superimposing helical coils of wire around a core wire which consists in applying a spacing film as a coating to one or more of said wires prior to their incorporation in the shafting, and removing said film after such incorporation but prior to the use of said shafting.

2. The process of manufacturing flexible shafting which consists in applying a spacing film to a core member prior to the application of the surrounding helical coil, and removing said film subsequent to such application, but prior to the use of said shafting.

3. The process of manufacturing flexible shafting which consists in applying a spacing film to a core member prior to the application of the surrounding helical coil, and subsequently removing such part of the film as separates the contiguous metal surfaces of the shafting elements.

4. The process of manufacturing flexible shafting which consists in applying a spacing film to a core member prior to the application of the surrounding helical coil, and subsequently reducing the thickness of the film where it separates contiguous elements of the shafting.

5. The process of manufacturing flexible shafting which consists in applying a spacing film of combustible material to the core member prior to the application of the surrounding helical coil, and subsequently removing said film by combustion.

6. The process of manufacturing flexible shafting which consists in applying a spacing film of soluble material to the core member prior to the application of the surrounding helical coil, and subsequently removing it by solution.

7. The process of manufacturing flexible shafting which consists in progressing a core, applying thereto a helical ribbon forming a spacing film and thereafter applying a helical coil wound in the reverse direction of the winding of the spacing film, and thereafter displacing said film.

8. The process of manufacturing flexible shafting which consists in progressing a core, applying to it successive helical layers, each wound in successively reversed directions, and applying a ribbon of spacing film to each core member prior to the application of the succeeding helical coil.

9. The process of manufacturing flexible shafting which consists in depositing a film of soluble material upon a core member, applying a helical winding to said core member, dissolving the deposited film and heating and drying the shafting.

10. The process of manufacturing flexible shafting which consists in progressing a core, applying to it successive helical layers, separated by spacer films of impermanent material and subjecting the product to a bending operation with a simultaneous heating of the bent product whereby the said impermanent material is removed.

11. The process of manufacturing flexible shafting which consists in progressing a core, applying to it successive helical layers, separated by spacer films of impermanent material and subjecting the product to a succession of transverse bending operations in successively varied planes to facilitate the removal of the said impermanent material.

12. The process of manufacturing flexible shafting which consists in progressing a core, applying to its in succession helical layers, a spacer film of impermanent material and a helically disposed layer of wire, and subjecting the product to a succession of transverse bending operations, and simultaneously heating the product during these bending operations to facilitate the physical removal of the impermanent material.

13. The process of manufacturing flexible shafting which consists in progressing a core, applying a film winding thereto, winding thereupon a helical coil, removing the film beneath the coil, applying another film above the coil and thereafter winding thereupon another helical coil.

14. The process of manufacturing flexible shafting in continuous lengths which consists in twisting a core body to a predetermined amount, progressing the core body thus twisted for the successive concurrent application of alternately reversely twisted helical coils at a pitch angle for the strands of less than 45 degrees each of which imparts torsional stress to the shafting elements, the torsional stress occasioned by the twisting of the core body being arranged both in direction and amount to counterbalance the residual torsional stress resulting from the application of the helical coils.

15. In a machine of the class described the combination of means for progressing a wire element, means for applying a liquid coating to the surface of said element as it progresses, and an electric heating coil through which the wire element and its applied coating passes, and means for rotating said heating coil on its longitudinal axis to thereby effect equalized heating of the applied film and the more rapid formation on said wire element of an adherent coating.

16. In a machine for the manufacture of flexible shafting in continuous lengths a winding head for applying helical coils of wire to a progressing core, means for applying a liquid coating to the core prior to its passage through the winding head, a tube forming the axial channel of the winding head through which the progressing core thus coated passes to the point where the strand wires are applied by the head, and heating means situated within said tube whereby drying of the coating is effected prior to the application of the strand wires.

17. In a machine of the class described the combination of means for progressing a core body, means for applying a helical coil around the same as it progresses, means for interposing destructible material between said core and the surrounding coil, deflecting means by the passage around which the shafting structure is bent and opened and means for causing a destructive fluid to enter the shafting structure through said bent and opened portions whereby it obtains access to the destructible material between the turns of the coil.

18. The process of manufacturing flexible shafting which consists in applying a helical coil around a core body; interposing a destructible material between the core and the helical coil; deflecting the product after it progresses sufficiently to open the coil where it is bent; and causing a destructive fluid to pass through such openings and thus obtain access between turns of the coil to the destructible material which it thereby destroys.

19. The process of manufacturing flexible shafting which consists in applying a spacing film to a core member prior to the application of the surrounding helical coil; and displacing said film subsequent to such application but prior to the use of said shafting.

20. The process of manufacturing flexible shafting which consists in applying a spacing film as a coating to wire; successively superimposing helical coils of said wire around a core member under a tension so great that the initial pressure engagement thereof requires relief; and relieving said pressure by displacing said coating.

21. The process of manufacturing flexible shafting which consists in paying out a core from a reel upon which it is wound, twisting said core by rotation of said reel, concurrently superimposing upon the core a series of helical coils alternately wound in different directions, each coil creating torsional stress; the torsional stress of the twisted core being such as to balance the algebraic sum of the stresses created by the winding of the successive helical coils.

ROBERT C. ANGELL.
FRANK L. O. WADSWORTH.